(12) United States Patent
Wang et al.

(10) Patent No.: US 10,643,340 B2
(45) Date of Patent: May 5, 2020

(54) METHOD AND DEVICE FOR ACQUIRING DEPTH INFORMATION AND GESTURE RECOGNITION APPARATUS

(71) Applicant: BOE TECHNOLOGY GROUP CO., LTD., Beijing (CN)

(72) Inventors: Pengpeng Wang, Beijing (CN); Haisheng Wang, Beijing (CN); Xiaoliang Ding, Beijing (CN); Chih-Jen Cheng, Beijing (CN); Yanling Han, Beijing (CN); Wei Liu, Beijing (CN); Xueyou Cao, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 120 days.

(21) Appl. No.: 15/915,016

(22) Filed: Mar. 7, 2018

(65) Prior Publication Data

US 2019/0114794 A1    Apr. 18, 2019

(30) Foreign Application Priority Data

Oct. 13, 2017  (CN) .......................... 2017 1 0952564

(51) Int. Cl.
*G06T 7/593* (2017.01)
*G06T 7/521* (2017.01)
(Continued)

(52) U.S. Cl.
CPC .............. *G06T 7/521* (2017.01); *G06F 3/017* (2013.01); *G06T 7/30* (2017.01); *G06T 7/593* (2017.01);
(Continued)

(58) Field of Classification Search
CPC .. G06T 7/521; G06T 7/30; G06T 7/70; G06T 7/593; G06T 2207/10048; G06T 2207/10012; H04N 5/33; G06F 3/017
See application file for complete search history.

(56) References Cited

U.S. PATENT DOCUMENTS 8,462,238 B2 * 6/2013 Fredembach ..... H01L 27/14621
348/273
9,098,908 B2   8/2015 Kirk et al.
(Continued)

FOREIGN PATENT DOCUMENTS

CN    102982530 A    3/2013
CN    204944450 A    1/2016
(Continued)

OTHER PUBLICATIONS

Birchfield, Stan, and Carlo Tomasi. "Depth discontinuities by pixel-to-pixel stereo." International Journal of Computer Vision35, No. 3 (1999): 269-293. (Year: 1999).*
(Continued)

*Primary Examiner* — Carol Wang
(74) *Attorney, Agent, or Firm* — Kinney & Lange, P.A.

(57) ABSTRACT

Embodiments of the present disclosure provide a method and a device for acquiring depth information, as well as a gesture recognition apparatus. The method includes: projecting an infrared spectrum to a target object; collecting the infrared spectrum reflected by the target object at different positions and generating a first infrared image and a second infrared image respectively; and processing the first infrared image and the second infrared image on a basis of infrared spectrum response characteristics to acquire the depth information of the target object.

14 Claims, 8 Drawing Sheets

(51) Int. Cl.
  *G06T 7/70* (2017.01)
  *G06F 3/01* (2006.01)
  *H04N 5/33* (2006.01)
  *G06T 7/30* (2017.01)
(52) U.S. Cl.
  CPC ............ *G06T 7/70* (2017.01); *H04N 5/33* (2013.01); *G06T 2207/10012* (2013.01); *G06T 2207/10048* (2013.01)

(56) References Cited

U.S. PATENT DOCUMENTS

| | | | |
|---|---|---|---|
| 9,454,820 B1* | 9/2016 | Kirmani | H04N 7/18 |
| 2013/0163853 A1* | 6/2013 | Kwak | G06T 7/73 |
| | | | 382/153 |
| 2013/0229396 A1* | 9/2013 | Huebner | H04N 9/3147 |
| | | | 345/207 |
| 2015/0248582 A1* | 9/2015 | Ryu | H04N 13/254 |
| | | | 382/103 |
| 2016/0288330 A1* | 10/2016 | Konolige | H04N 13/239 |
| 2016/0366346 A1* | 12/2016 | Shin | H04N 5/33 |
| 2017/0032531 A1* | 2/2017 | Nagata | G01B 11/2513 |
| 2017/0034499 A1* | 2/2017 | Doron | H04N 5/332 |
| 2017/0041585 A1* | 2/2017 | Liu | H04N 13/271 |
| 2017/0094256 A1* | 3/2017 | Bronstein | G06T 7/529 |
| 2017/0096144 A1 | 4/2017 | Elie et al. | |
| 2017/0177075 A1* | 6/2017 | Zhang | G06F 3/013 |
| 2017/0195654 A1* | 7/2017 | Powers | G06T 7/521 |
| 2017/0272727 A1* | 9/2017 | Jiang | H04N 13/128 |
| 2019/0087968 A1* | 3/2019 | Grunnet-Jepsen | G06T 7/521 |

FOREIGN PATENT DOCUMENTS

| | | |
|---|---|---|
| CN | 105554470 A | 5/2016 |
| CN | 105929939 A | 9/2016 |
| CN | 107031332 A | 8/2017 |

OTHER PUBLICATIONS

Second Chinese Office Action dated Feb. 3, 2020, received for corresponding Chinese Application No. 201710952564.9, 15 pages.

* cited by examiner

METHOD AND DEVICE FOR ACQUIRING DEPTH INFORMATION AND GESTURE RECOGNITION APPARATUS

CROSS-REFERENCE TO RELATED APPLICATION

This application claims the benefit of the Chinese Patent Application No. 201710952564.9, filed with the State Intellectual Property Office of China on Oct. 13, 2017, which is incorporated herein by reference in its entirety.

BACKGROUND OF THE DISCLOSURE

Field of the Disclosure

The present disclosure relates to the technical field of vision, and in particular, to a method and a device for acquiring depth information and a gesture recognition apparatus.

Description of the Related Art

As smart electronic devices increase and human-computer interaction technology develops, gesture interaction technology has gradually become a research focus of the people. Gesture interaction uses technology such as computer graphics to recognize body language of humans and convert it into commands to operate devices. Gesture interaction is a new human-computer interaction means other than a mouse, a keyboard and a touch screen. As virtual reality augmented reality (VRAR) technology becomes so popular, the gesture interaction technology will develop quickly in the coming years.

For gesture interaction technology, gesture recognition is a key technique. The related art has proposed a depth information-based gesture recognition method which needs to acquire the depth information of a target in field of view. At present, the depth information is acquired mainly by the following three methods, that is, a multi-camera vision method, a time of fly (TOF) method and a structure light method. In the multi-camera vision method, three-dimensional vision of two lenses is used to measure depth of scene. Cameras emit active light waves to illuminate three-dimensional scene and the light waves are reflected by the three-dimensional scene back to a depth camera. The accuracy of acquiring the depth information is reduced rapidly as the distance from the target increases and depends on states of surface of the target, in particular, when the target has less texture, the recognition accuracy will become relatively low. In the time of fly method, the time difference (phase difference) between time at which the light waves are emitted and the time at which the light waves are reflected is used to acquire the depth information of the three-dimensional scene. It has disadvantages of such as low resolution, inaccuracy of edge. The basic principle of the structure light method is to project one or more coded patterns into a target scene and the spatial coordinates of the object to be illuminated can be derived by means of calculating the deformation or relative change of displacement of information of coded structure light received by a camera device. The structure light method is a kind of efficient measurement method, but it needs to code and decode the projected patterns. Thus, it has a complex scheme in whole and high complicated algorithm and great calculation. In this way, the speed of generating the depth information is relatively slow such that the depth information cannot be acquired in real-time indeed. Meanwhile, the depth cameras which are based on these methods have complex optical and electronic devices and thus it is often difficult to be miniaturized and is expensive such that ordinary customers cannot accept them.

SUMMARY

An embodiment of the present disclosure can solve the technical problem of providing a method and a device for acquiring depth information and a gesture recognition apparatus, so as to at least partly alleviate the technical defects of such as complex algorithms and great calculations for the method for acquiring the depth information in the related art.

In accordance with one aspect of the present disclosure, it provides a method for acquiring depth information, comprising:

projecting an infrared spectrum to a target object;

collecting the infrared spectrum reflected by the target object at different positions and generating a first infrared image and a second infrared image respectively; and processing the first infrared image and the second infrared image on a basis of infrared spectrum response characteristics to acquire the depth information of the target object.

In one embodiment, the step of projecting the infrared spectrum to the target object comprises:

emitting an infrared light; and dispersing the infrared light on a basis of its wavelengths to convert the infrared light into the infrared spectrum and projecting the infrared spectrum to the target object.

In one embodiment, the step of collecting the infrared spectrum reflected by the target object at different positions and generating the first infrared image and the second infrared image respectively comprises:

collecting the infrared spectrum reflected by the target object at a first position and a second position respectively; and generating the first infrared image and the second infrared image from the infrared spectrum reflected by the target object respectively;

wherein the first infrared image and the second infrared image have different responses to the infrared lights with different wavelengths and the wavelength to which the first infrared image and the second infrared image have maximum relative response is same to the wavelength having highest energy from an infrared light source.

In one embodiment, the step of processing the first infrared image and the second infrared image on a basis of infrared spectrum response characteristics to acquire the depth information of the target object comprises:

correcting the first infrared image and the second infrared image to align the first infrared image with the second infrared image in a horizontal direction;

determining a plurality of matched points in the first infrared image and the second infrared image on the basis of the infrared spectrum response characteristics; and determining spatial three-dimensional coordinates of the target object from two-dimensional coordinates of the plurality of matched points.

In one embodiment, the step of determining the plurality of matched points in the first infrared image and the second infrared image on the basis of the infrared spectrum response characteristics comprises:

matching pixels in rows of pixels in the first infrared image and the second infrared image on a same horizontal level to determine the plurality of matched points.

In one embodiment, the infrared spectrum projected to the target object is a continuous infrared spectrum; and the step of matching pixels in rows of pixels in the first infrared image and the second infrared image on the same horizontal level to determine the plurality of matched points comprises:

determining a first pixel of the first infrared image having maximum intensity value in a row of pixels of the first infrared image, determining a first pixel of the second infrared image having maximum intensity value in a row of pixels of the second infrared image, and determining the first pixel of the first infrared image and the first pixel of the second infrared image as matched points;

selecting a pixel at a left side of the first pixel of the first infrared image and in the row of pixels of the first infrared image and determining an intensity value of the selected pixel, finding a pixel, which has same intensity value as the selected pixel, at a left side of the first pixel of the second infrared image and in the row of pixels of the second infrared image, and determining the selected pixel and the found pixel as matched points; and selecting a pixel at a right side of the first pixel of the first infrared image and in the row of pixels of the first infrared image and determining an intensity value of the selected pixel, finding a pixel, which has same intensity value as the selected pixel, at a right side of the first pixel of the second infrared image and in the row of pixels of the second infrared image, and determining the selected pixel and the found pixel as matched points.

In one embodiment, the infrared spectrum projected to the target object is a discrete infrared spectrum; and the step of matching pixels in rows of pixels in the first infrared image and the second infrared image on the same horizontal level to determine the plurality of matched points comprises:

determining a first waveband of the first infrared image having maximum average intensity value in a row of pixels of the first infrared image, determining a first waveband of the second infrared image having maximum average intensity value in a row of pixels of the second infrared image, and determining the first waveband of the first infrared image and the first waveband of the second infrared image as matched bands;

selecting a plurality of left adjacent wavebands sequentially at a left side of the first waveband of the first infrared image and in the row of pixels of the first infrared image depending on their distances from the first waveband of the first infrared image, selecting a plurality of left adjacent wavebands sequentially at a left side of the first waveband of the second infrared image and in the row of pixels of the second infrared image depending on their distances from the first waveband of the second infrared image, and correspondingly matching the plurality of left adjacent wavebands of the first infrared image with the plurality of left adjacent wavebands of the second infrared image to form matched bands; and selecting a plurality of right adjacent wavebands sequentially at a right side of the first waveband of the first infrared image and in the row of pixels of the first infrared image depending on their distances from the first waveband of the first infrared image, selecting a plurality of right adjacent wavebands sequentially at a right side of the first waveband of the second infrared image and in the row of pixels of the second infrared image depending on their distances from the first waveband of the second infrared image, and correspondingly matching the plurality of right adjacent wavebands of the first infrared image with the plurality of right adjacent wavebands of the second infrared image to form matched bands.

In one embodiment, the step of processing the first infrared image and the second infrared image on the basis of infrared spectrum response characteristics to acquire the depth information of the target object comprises:

correcting the first infrared image and the second infrared image to align the first infrared image with the second infrared image in a horizontal direction;

determining a plurality of matched points in the first infrared image and the second infrared image on the basis of the infrared spectrum response characteristics; and determining spatial three-dimensional coordinates of the target object from two-dimensional coordinates of the plurality of matched points, wherein the step of determining the plurality of matched points in the first infrared image and the second infrared image on the basis of the infrared spectrum response characteristics comprises:

matching pixels in rows of pixels in the first infrared image and the second infrared image on a same horizontal level to determine the plurality of matched points.

In one embodiment, the infrared spectrum projected to the target object is a continuous infrared spectrum; and the step of matching pixels in rows of pixels in the first infrared image and the second infrared image on the same horizontal level to determine the plurality of matched points comprises:

determining a first pixel of the first infrared image having maximum intensity value in a row of pixels of the first infrared image, determining a first pixel of the second infrared image having maximum intensity value in a row of pixels of the second infrared image, and determining the first pixel of the first infrared image and the first pixel of the second infrared image as matched points;

selecting a pixel at a left side of the first pixel of the first infrared image and in the row of pixels of the first infrared image and determining an intensity value of the selected pixel, finding a pixel, which has same intensity value as the selected pixel, at a left side of the first pixel of the second infrared image and in the row of pixels of the second infrared image, and determining the selected pixel and the found pixel as matched points; and selecting a pixel at a right side of the first pixel of the first infrared image and in the row of pixels of the first infrared image and determining an intensity value of the selected pixel, finding a pixel, which has same intensity value as the selected pixel, at a right side of the first pixel of the second infrared image and in the row of pixels of the second infrared image, and determining the selected pixel and the found pixel as matched points.

In one embodiment, the infrared spectrum projected to the target object is a discrete infrared spectrum; and the step of matching pixels in rows of pixels in the first infrared image and the second infrared image on the same horizontal level to determine the plurality of matched points comprises:

determining a first waveband of the first infrared image having maximum average intensity value in a row of pixels of the first infrared image, determining a first waveband of the second infrared image having maximum average intensity value in a row of pixels of the second infrared image, and determining the first waveband of the first infrared image and the first waveband of the second infrared image as matched bands;

selecting a plurality of left adjacent wavebands sequentially at a left side of the first waveband of the first infrared image and in the row of pixels of the first infrared image depending on their distances from the first waveband of the first infrared image, selecting a plurality of left adjacent wavebands sequentially at a left side of the first waveband of the second infrared image and in the row of pixels of the second infrared image depending on their distances from the first waveband of the second infrared image and correspondingly matching the plurality of left adjacent wavebands of the first infrared image with the plurality of left adjacent wavebands of the second infrared image to form matched bands; and selecting a plurality of right adjacent wavebands sequentially at a right side of the first waveband of the first infrared image and in the row of pixels of the first infrared image depending on their distances from the first waveband of the first infrared image, selecting a plurality of right adjacent wavebands sequentially at a right side of the first waveband of the second infrared image and in the row of pixels of the second infrared image depending on their distances from the first waveband of the second infrared image and correspondingly matching the plurality of right adjacent wavebands of the first infrared image with the plurality of right adjacent wavebands of the second infrared image to form matched bands.

In accordance with another aspect of the present disclosure, it provides a device for acquiring depth information, comprising:

an infrared spectrum projector configured to project an infrared spectrum to a target object;

an infrared collector configured to collect the infrared spectrum reflected by the target object at different positions and to generate a first infrared image and a second infrared image respectively; and a processor configured to process the first infrared image and the second infrared image on a basis of infrared spectrum response characteristics to acquire the depth information of the target object.

In one embodiment, the infrared spectrum projector comprises:

an infrared light source configured to emit an infrared light; and a diffraction device configured to disperse the infrared light on a basis of its wavelengths to convert the infrared light into the infrared spectrum and configured to project the infrared spectrum to the target object.

In one embodiment, the infrared collector comprises a first infrared collector and a second infrared collector arranged on a same horizontal level, a predetermined distance between the first infrared collector and the second infrared collector being provided, the first infrared collector and the second infrared collector being configured to collect the infrared spectrum reflected by the target object at a first position and a second position respectively and to generate the first infrared image and the second infrared image from the infrared spectrum reflected by the target object respectively;

wherein the first infrared collector and the second infrared collector have different responses to the infrared lights with different wavelengths and the wavelength to which the first infrared image and the second infrared image have maximum relative response is same to the wavelength having highest energy from an infrared light source.

In one embodiment, the processor comprises:

an image correcting module configured to correct the first infrared image and the second infrared image to align the first infrared image with the second infrared image in a horizontal direction;

an image matching module configured to determine a plurality of matched points in the first infrared image and the second infrared image on the basis of the infrared spectrum response characteristics; and a coordinate converting module configured to determine spatial three-dimensional coordinates of the target object from two-dimensional coordinates of the plurality of matched points.

In one embodiment, the image matching module comprises:

a matching unit configured to match pixels in rows of pixels in the first infrared image and the second infrared image on a same horizontal level to determine the plurality of matched points.

In one embodiment, the infrared spectrum projected to the target object is a continuous infrared spectrum; and the matching unit comprises:

a maximum intensity value pixel matching sub-unit configured to determine a first pixel of the first infrared image having maximum intensity value in a row of pixels of the first infrared image, to determine a first pixel of the second infrared image having maximum intensity value in a row of pixels of the second infrared image, and to determine the first pixel of the first infrared image and the first pixel of the second infrared image as matched points;

a left pixel matching sub-unit configured to select a pixel at a left side of the first pixel of the first infrared image and in the row of pixels of the first infrared image and to determine an intensity value of the selected pixel, to find a pixel, which has same intensity value as the selected pixel, at a left side of the first pixel of the second infrared image and in the row of pixels of the second infrared image, and to determine the selected pixel and the found pixel as matched points; and a right pixel matching sub-unit configured to select a pixel at a right side of the first pixel of the first infrared image and in the row of pixels of the first infrared image and to determine an intensity value of the selected pixel, to find a pixel, which has same intensity value as the selected pixel, at a right side of the first pixel of the second infrared image and in the row of pixels of the second infrared image, and to determine the selected pixel and the found pixel as matched points.

In one embodiment, the infrared spectrum projected to the target object is a discrete infrared spectrum; and the matching unit comprises:

a maximum intensity value waveband matching sub-unit configured to determine a first waveband of the first infrared image having maximum average intensity value in a row of pixels of the first infrared image, to determine a first waveband of the second infrared image having maximum average intensity value in a row of pixels of the second infrared image, and to determine the first waveband of the first infrared image and the first waveband of the second infrared image as matched bands;

a left waveband matching sub-unit configured to select a plurality of left adjacent wavebands sequentially at a left side of the first waveband of the first infrared image and in the row of pixels of the first infrared image depending on their distances from the first waveband of the first infrared image, to select a plurality of left adjacent wavebands sequentially at a left side of the first waveband of the second infrared image and in the row of pixels of the second infrared image depending on their distances from the first waveband of the second infrared image, and to correspondingly match the plurality of left adjacent wavebands of the first infrared image with the plurality of left adjacent wavebands of the second infrared image to form matched bands; and a right waveband matching sub-unit configured to select a plurality of right adjacent wavebands sequentially at a right side of the first waveband of the first infrared image and in the row of pixels of the first infrared image depending on their distances from the first waveband of the first infrared image, to select a plurality of right adjacent wavebands sequentially at a right side of the first waveband of the second infrared image and in the row of pixels of the second infrared image depending on their distances from the first waveband of the second infrared image, and to correspondingly match the plurality of right adjacent wavebands of the first infrared image with the plurality of right adjacent wavebands of the second infrared image to form matched bands.

In one embodiment, the processor comprises:

an image correcting module configured to correct the first infrared image and the second infrared image to align the first infrared image with the second infrared image in a horizontal direction;

an image matching module configured to determine a plurality of matched points in the first infrared image and the second infrared image on the basis of the infrared spectrum response characteristics; and a coordinate converting module configured to determine spatial three-dimensional coordinates of the target object from two-dimensional coordinates of the plurality of matched points.

In one embodiment, the processor comprises:

an image correcting module configured to correct the first infrared image and the second infrared image to align the first infrared image with the second infrared image in a horizontal direction;

an image matching module configured to determine a plurality of matched points in the first infrared image and the second infrared image on the basis of the infrared spectrum response characteristics; and a coordinate converting module configured to determine spatial three-dimensional coordinates of the target object from two-dimensional coordinates of the plurality of matched points.

In accordance with a further aspect of the present disclosure, it provides a gesture recognition apparatus comprising the device for acquiring depth information as described above.

Of course, any one of products or methods in the present disclosure may not achieve all of advantages. Other features and advantages of the present disclosure will be explained in the following embodiments of the present disclosure. And they will be apparent partly in the embodiments of the present description or will be known from the present disclosure. Objects and other advantages of the embodiments of the present disclosure may be achieved and obtained from structures specified in the description, claims and drawings.

BRIEF DESCRIPTION OF THE DRAWINGS

Figures illustrated herein are intended to further understand the technical solutions of the present disclosure and constitute a part of the description. They are intended to explain the technical solutions of the present disclosure in combination with the embodiments of the present disclosure, instead of limiting the technical solutions of the present disclosure. Shapes and sizes of various components in figures do not reflect real scale, but only illustrate the present disclosure.

DETAILED DESCRIPTION

Embodiments of the present disclosure will further be explained with reference to figures and embodiments. The embodiments are intended to explain the present disclosure, instead of limiting the scope of the present disclosure. It should be noted that the embodiments and features thereof in the present disclosure may be combined arbitrarily unless they are contradicted with each other.

Figure 1:
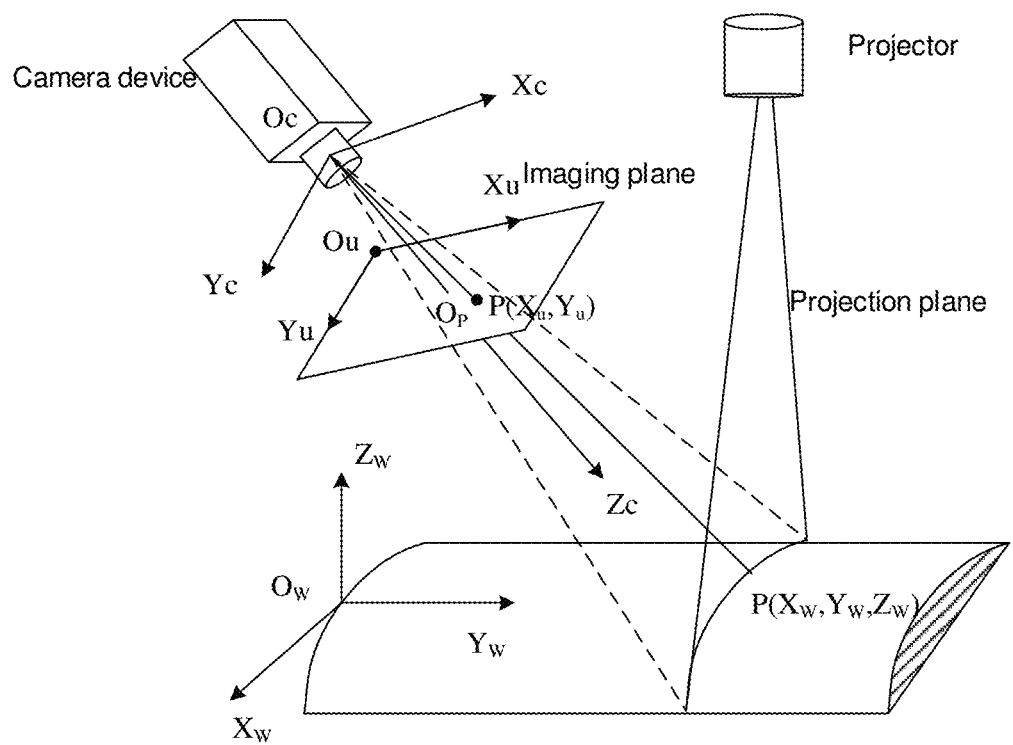
FIG. 1 shows a principle diagram of a structure light method according to the present disclosure.

FIG. 1 is a schematic view showing the principle of the structure light method according to an embodiment of the present disclosure. As illustrated in FIG. 1, the basic principle of the structure light method is to derive spatial coordinates of the object to be illuminated by means of calculating the deformation or relative change of displacement of information of coded structure light received by a camera device. The method is mainly directed to two core components, i.e., one is a projector for projecting the structure light; the other is a camera device for receiving the coded structure light reflected by the object. It can be seen from the basic principle shown in FIG. 1 that the key point of the technology is to decode the structure light and to derive the spatial coordinates finally. In an algorithm, it is typically to find the correspondence between special points in the image and spatial points by the algorithm or by another indirect method, but the complexity and calculation amount of the algorithm will be great whatever means is selected.

As to the technical defects such as complex algorithm and great calculation amount for the structure light method according to the embodiment of the present disclosure, another embodiment of the present disclosure provides a method and a device for acquiring the depth information which are based on an infrared structure light. The method and the device can project an infrared spectrum to a three-dimensional space to acquire patterns of the spectrum reflected by a target object and acquire the depth information of the target on a basis of infrared spectrum response characteristics. They have advantages of such as high resolution, simple algorithm and low calculation amount.

Figure 2A:
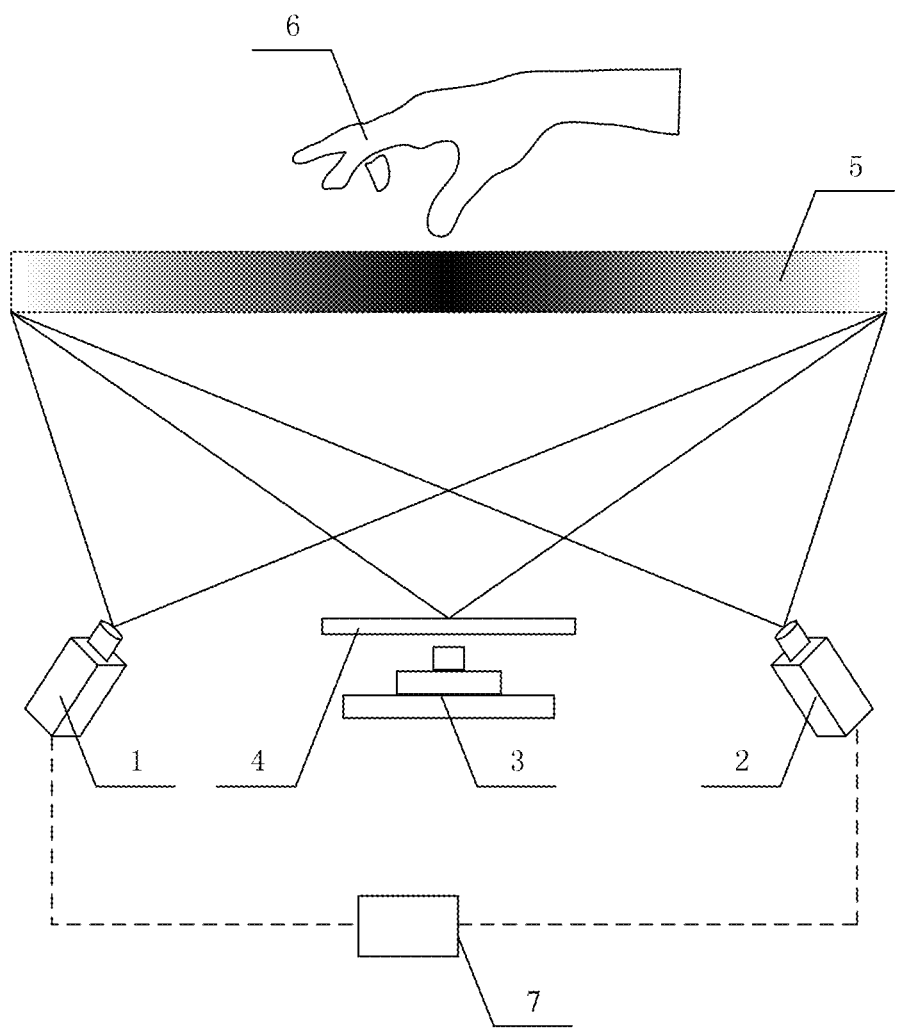
FIG. 2A is a schematic view showing a structure of a device for acquiring depth information according to an embodiment of the present disclosure.

FIG. 2A is a schematic view showing a structure of a device for acquiring depth information according to an embodiment of the present disclosure. As shown in FIG. 2A, a main body of the infrared structure light-based device for acquiring depth information includes a first infrared collector 1, a second infrared collector 2, an infrared light source 3, a diffraction device 4 and a processor 7. The first infrared collector 1 and the second infrared collector 2 are arranged on a same horizontal level. A predetermined distance between them is provided. The infrared light source 3 is arranged between the first infrared collector 1 and the second infrared collector 2 and configured to emit an infrared light in a predetermined wavelength range. The diffraction device 4 is arranged between the infrared light source 3 and the target object 6 and configured to convert the infrared light emitted by the infrared light source 3 into a divergent infrared spectrum 5 and to project it to the target object 6. The first infrared collector 1 and the second infrared collector 2 are configured to collect the infrared spectrum reflected by the target object 6 at different angles to form a first infrared image 11 and a second infrared image 12 respectively (see FIG. 5). The processor 7 is connected to the first infrared collector 1 and the second infrared collector 2 and receives the first infrared image 11 from the first infrared collector 1 and the second infrared image 12 from the second infrared collector 2 respectively. The processor 7 processes the first infrared image 11 and the second infrared image 12 on the basis of the infrared spectrum response characteristics to acquire the depth information of the target object 6. It should be noted that the infrared spectrum is schematically shown by visible spectrum in FIG. 2A for convenience of indicating the infrared spectrum.

Figure 3:
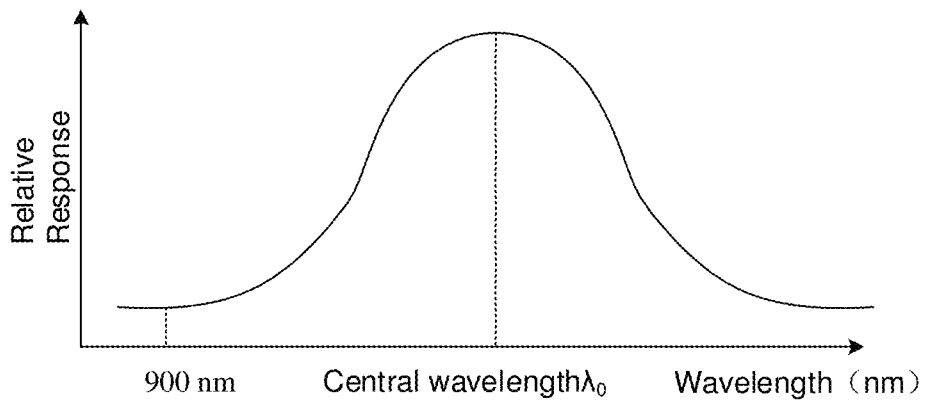
FIG. 3 is a graph showing spectrum response curve of an infrared sensor according to an embodiment of the present disclosure.

In an example, FIG. 3 shows a graph of the spectrum response curve of the infrared sensor according to an embodiment of the present disclosure. The infrared light source 3 may be a near-infrared light source with a wavelength range of $\lambda 1$ to $\lambda 2$ nm and with a wavelength of $\lambda_0$ nm corresponding to maximum of energy. For example, the wavelength range may be 900 nm to 1800 nm and the energy may be distributed mainly at around $\lambda_0$=1300 nm. The diffraction device 4, as an optical diffraction device, may use a two-dimensional diffraction grating to disperse the infrared light incident onto the two-dimensional diffraction grating on the basis of its different wavelengths and then may converge the dispersed infrared light by an imaging lens to form an infrared spectrum to be projected to the target object. The first infrared collector 1 and the second infrared collector 2 may be infrared cameras that have wavelength range corresponding to the infrared light source. The infrared cameras (infrared sensors) have different responses to the infrared lights with different wavelengths and have the maximum of relative response at the wavelength $\lambda_0$. As shown in FIG. 3, the infrared sensors have maximum relative response to the spectrum at the central wavelength $\lambda_0$; however, the relative response decreases monotonically at both sides of the central wavelength $\lambda_0$. Due to such characteristics of the infrared sensors, the infrared images collected by the infrared cameras have the same trend as the spectrum response curve shown in FIG. 3.

In an embodiment of the present disclosure, the main processing operations of the processor 7 for acquiring the depth information of the target object by image processing include: image correction, image matching and coordinate conversion. The image correction is configured to align the first infrared image 11 collected by the first infrared collector 1 with the second infrared image 12 collected by the second infrared collector 2 in horizontal direction. The image matching is configured to determine a plurality of matched points in the first infrared image 11 and the second infrared image 12. The coordinate conversion is configured to obtain the spatial three-dimensional coordinates of the target object 6 from the two-dimensional coordinates of the plurality of matched points.

The technical solutions of the embodiments of the present disclosure will be explained in details with reference to specific embodiments below.

Figure 4:
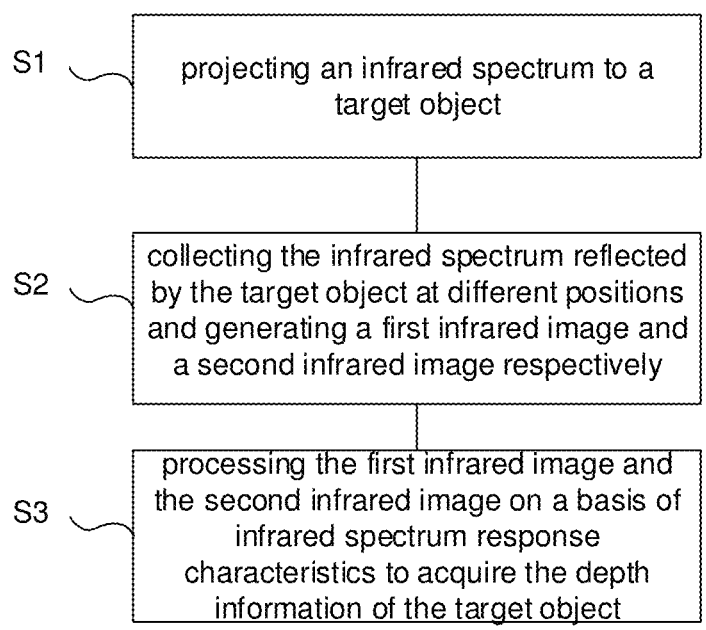
FIG. 4 is a flow chart of a method for acquiring depth information according to an embodiment of the present disclosure.

Based on the system architecture of the above device for acquiring depth information, the present embodiment provides a method for acquiring depth information. FIG. 4 is a flow chart for the method for acquiring depth information according to the embodiment of the present disclosure. With reference to FIG. 2A and FIG. 5 again, the method for acquiring depth information includes:

S1: projecting an infrared spectrum 5 to a target object 6;

S2: collecting the infrared spectrum reflected by the target object 6 at different positions and generating a first infrared image 11 and a second infrared image 12 respectively; and S3: processing the first infrared image 11 and the second infrared image 12 on a basis of infrared spectrum response characteristics to acquire the depth information of the target object 6.

In an example, the step S1 includes:

S11: emitting an infrared light; and

S12: dispersing the infrared light on a basis of its wavelengths to convert the light into the infrared spectrum and projecting the infrared spectrum to the target object 6.

In the embodiment, the step S11 in particular includes emitting the infrared light in a predetermined wavelength range such that the infrared spectrum with the predetermined wavelength range is projected to the target object 6 and the infrared spectrum projected to the target object 6 is a continuous infrared spectrum.

In an example, the step S2 includes:

S21: collecting the infrared spectrum reflected by the target object 6 at a first position and at a second position respectively; and S22: generating the first infrared image 11 and the second infrared image 12 from the infrared spectrum reflected by the target object 6 respectively.

In the example, the first infrared image 11 and the second infrared image 12 have different responses to the infrared lights with different wavelengths and the wavelength to which the first infrared image and the second infrared image have maximum relative response is same to the wavelength having highest energy from the infrared light source.

In an example, the step S3 includes:

S31: correcting the first infrared image 11 and the second infrared image 12 to align the first infrared image 11 with the second infrared image 12 in horizontal direction;

S32: determining a plurality of matched points in the first infrared image 11 and the second infrared image 12 on the basis of the infrared spectrum response characteristics; and S33: obtaining or determining spatial three-dimensional coordinates of the target object 6 from two-dimensional coordinates of the plurality of matched points.

In fact, the step S31 is intended to calibrate and correct two infrared collectors 1, 2 such that the two infrared collectors 1, 2 have optical axes completely parallel to each other. In the embodiment, the two infrared collectors 1, 2 are arranged on the same horizontal level, however, considering errors of such as structure design and mounting, the two infrared collectors 1, 2 will still have errors in the horizontal direction in practice, such that the positions of the target object 6 in the first infrared image 11 and the second infrared image 12 are not at the same level. In the embodiment, by image correction process, the first infrared image 11 and the second infrared image 12 may be aligned with each other in the horizontal direction, that is, the position of the target object 6 in the first infrared image 11 and the position of the target object 6 in the second infrared image 12 are located at the same horizontal line. It means that two infrared images 11, 12 are collected by two infrared collectors having optical axes completely parallel to each other. In practice, the infrared image correction process may use such as bouguet algorithm. Furthermore, the step S31 may further include the corresponding preprocess on the infrared images. For example, in order to eliminate the infrared light in environment, the infrared light in the environment may be shot as a basic infrared image. After the infrared images of the target object are acquired, operation is performed for the infrared images of the target object and the basic infrared image (such as subtraction between the infrared images of the target object and the basic infrared image), so as to achieve compensation process of the infrared light in environment.

As to the defects of large complexity of algorithm and great calculation amount for the structure light-based method for acquiring the depth information, the present embodiment provides a matching method based on the infrared spectrum response characteristics. The matching method has high resolution, simple algorithm and low calculation amount.

In an example, the step S32 includes:

Step S321: normalizing all of pixels of the first infrared image 11 and the second infrared image 12;

Step S322: matching pixels in rows of pixels in the first infrared image 11 and the second infrared image 12 on a same horizontal level to determine the plurality of matched points.

In fact, the normalizing process of the step S321 is intended to improve the matching accuracy. It is not necessary for matching process and the normalizing process may not be performed in practice.

In an example, the step S322 includes:

Step S3221: determining a first pixel of the first infrared image having maximum intensity value in a row of pixels of the first infrared image 11, determining a first pixel of the second infrared image having maximum intensity value in a row of pixels of the second infrared image 12, and determining the first pixel of the first infrared image and the first pixel of the second infrared image as the matched points;

Step S3222: selecting a pixel at a left side of the first pixel of the first infrared image and in the row of pixels of the first infrared image 11 and determining an intensity value of the selected pixel, finding a pixel, which has same intensity value as the selected pixel, at a left side of the first pixel of the second infrared image 12 and in the row of pixels of the second infrared image, and determining the selected pixel and the found pixel as the matched points; and Step S3223: selecting a pixel at a right side of the first pixel of the first infrared image 11 and in the row of pixels of the first infrared image 11 and determining an intensity value of the selected pixel, finding a pixel, which has same intensity value as the selected pixel, at a right side of the first pixel of the second infrared image 12 and in the row of pixels of the second infrared image 12, and determining the selected pixel and the found pixel as the matched pixels.

The step S3222 and the step S3223 may be performed simultaneously, or the step S3223 may be performed at first and then the step S3222 may be performed.

For the infrared images collected by the infrared collectors 1, 2, each pixel has a value, i.e., the infrared intensity value of the pixel. If the $M1^{th}$ row of pixels of the first infrared image 11 and the $M1'^{th}$ row of pixels of the second infrared image 12 are located at a same horizontal level, it will at first determine the first pixel of the first infrared image which has maximum intensity value and coordinates (M1, N1) in the $M1^{th}$ row of pixels of the first infrared image 11, and then will determine the first pixel of the second infrared image which has maximum intensity value and coordinates (M1', N1') in the $M1'^{th}$ row of pixels of the second infrared image 12, and determine the first pixel of the first infrared image and the first pixel of the second infrared image both having the maximum intensity values as first matched points. N1 represents a column at which the first pixel of the first infrared image 11 is located, within the first infrared image 11. N1' represents a column at which the first pixel of the second infrared image 12 is located, within the second infrared image 12.

After the pixels having the maximum intensity values respectively are matched, the pixels at the left side thereof and those at the right side thereof can be matched on a basis of the matched points. For the left side, the $i^{th}$ pixel (M1, N1−i) is at first selected in the $M1^{th}$ row of pixels of the first infrared image 11 and the intensity value Pi of the $i^{th}$ pixel is determined, and then the $i'^{th}$ pixel having the intensity value of Pi is found from a range of pixel (M1', 1) to (M1', N1'−i) in the $M1'^{th}$ row of pixels of the second infrared image 12 and the $i^{th}$ pixel and the $i'^{th}$ pixel are determined as the $i^{th}$ matched points, where i=1 to N1−1. For the right side, the $j^{th}$ pixel (M1, N1+j) is at first selected in the $M1^{th}$ row of pixels of the first infrared image 11 and the intensity value Pj of the $j^{th}$ pixel is determined, and then the $j'^{th}$ pixel having the intensity value of Pj is found from a range of pixel (M1', N1'+j) to (M1', N') in the $M1'^{th}$ row of pixels of the second infrared image 12 and the $j^{th}$ pixel and the $j'^{th}$ pixel are determined as the $j^{th}$ matched points, where j=N1+1 to N, N represents total number of columns of the first infrared image 11 and N' represents total number of columns of the second infrared image 12. In this way, it may finish matching all of pixels in the $M1^{th}$ row of pixels of the first infrared image 11 and those in the $M1'^{th}$ row of pixels of the second infrared image 12.

In the embodiment of the present disclosure, after the first infrared image 11 and the second infrared image 12 are aligned with each other in the horizontal level, two images 11, 12 have been located in the same horizontal level in the horizontal direction. Thus, the matching operation may be achieved on a basis of the same horizontal level and the matched points are found at the same row of pixels. For example, after they are aligned in the horizontal level, the $M1^{th}$ row of pixels of the first infrared image 11 and the $M1'^{th}$ row of pixels of the second infrared image 12 are located on the same horizontal level. Thus, the $M1^{th}$ row of pixels and the $M1'^{th}$ row of pixels are matched on the basis of the same horizontal level. The infrared sensors of the present disclosure have different responses to the infrared lights with different wavelengths and having the maximum of the relative response at the central wavelength. Thus, the first infrared image 11 and the second infrared image 12 also have such characteristics. From the spectrum response characteristics of the infrared images, it can be determined that the wavelength corresponding to the first pixel of the first infrared image having maximum intensity value in the $M1^{th}$ row of pixels is the central wavelength and the wavelength corresponding to the first pixel of the second infrared image having maximum intensity value in the $M1'^{th}$ row of pixels is also the central wavelength. The infrared lights with different wavelengths in the infrared spectrum are projected to different locations or positions on the target object 6, but the infrared light with the same wavelength will be projected to a unique position on the target object 6. Thus, only same position can reflect the infrared light with the same wavelength, that is, the first pixel of the first infrared image 11 having maximum of the intensity value therein and the first pixel of the second infrared image 12 having maximum of the intensity value therein correspond to the same position on the target object 6.

As such, the spectrum response curves of the infrared sensors 1, 2 of the present disclosure have maximum relative response at the central wavelength and each of the relative responses decreases monotonically at both sides of the central wavelength, thus, other matched points in the same row of pixels can be found rapidly on the basis of the characteristics. After the first matched points having the central wavelength (the first pixel of the first infrared image and the first pixel of the second infrared image) are determined, other matched points need to be sought only in a range of the same side of the first pixel of the first infrared image and the first pixel of the second infrared image. In particular, a second pixel (M1, N1−1) which is located at the left side of the first pixel (M1, N1) of the first infrared image 11 and adjacent to the first pixel (M1, N1) of the first infrared image is at first selected in the M1$^{th}$ row of pixels of the first infrared image 11 and the intensity value P2 of the second pixel is determined, and then the 2$'^{ed}$ pixel having the intensity value of P2 is found from a range of pixels (M1', 1) to (M1', N1'−1) in the M1'$^{th}$ row of pixels of the second infrared image 12 and the second pixel and the 2$'^{ed}$ pixel are determined as the second matched points corresponding to the same point on the target object. As an analogy, other matched points may also be found. For the right side, the matched points can also be determined similarly. After the matching process for one row of pixels has been finished, the matching process for the other rows of pixels can be performed, and finally the matching process for two whole infrared images can be finished.

It can be seen from the above process that, by means of different response characteristics to the infrared lights with different wavelengths in the infrared image, the embodiment of the present disclosure proposed a matching method based on the infrared spectrum response characteristics. At first, the first matched points at the central wavelength are determined by the maximum intensity values in two infrared images, and then other matched points can be determined rapidly on the basis of the first matched points. As the number of the matched points which have been determined increases, the range of matching is gradually reduced and the calculation amount is gradually reduced. In comparison with the conventional matching method, the matching method based on the infrared spectrum response characteristics according to the embodiments of the present disclosure has the advantages of simple algorithm and low calculation amount, so as to reduce the calculation amount significantly. In practice, after the first matched points are determined, step size for processing other matched points may be determined as required. The smallest step size is one pixel. Thus, in the embodiments of the present disclosure, the maximum number of the matched points may be equal to number of the pixels in the infrared image, such that high resolution can be advantageously obtained.

In practice, normalization for values of all of pixels in the infrared image may be performed by such as triangulation measurement principle in three-dimensional reconstruction technology. The process for determining the three-dimensional spatial coordinates of the target object from the two-dimensional coordinates of the matched points may also be performed by such as triangulation measurement principle in three-dimensional reconstruction technology.

Figure 5:
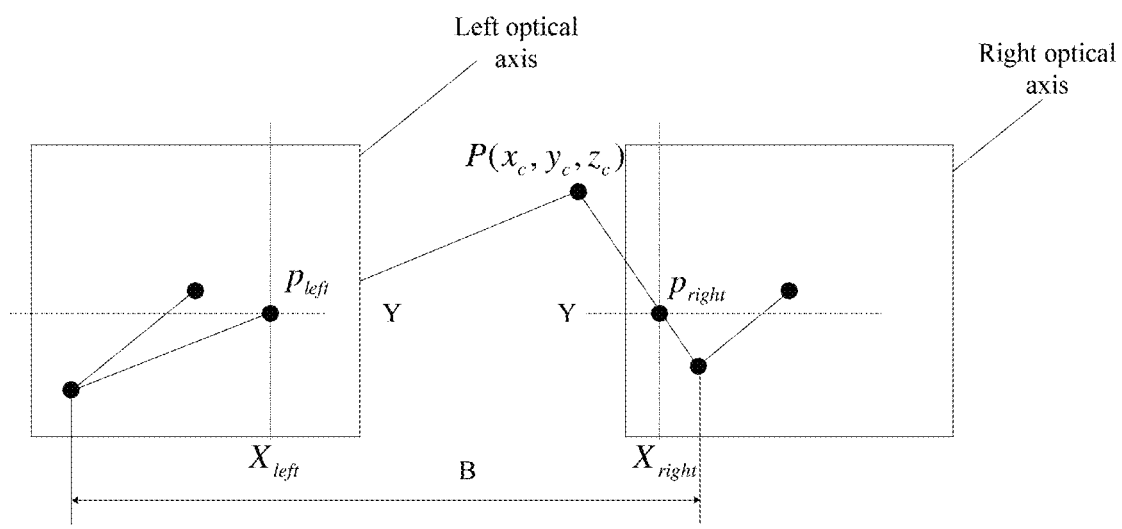
FIG. 5 is a schematic view showing a triangulation measurement principle according to an embodiment of the present disclosure.

FIG. 5 is a schematic view showing the triangulation measurement principle according to an embodiment of the present disclosure. As shown in FIG. 5, for a feature point P($x_c$, $y_c$, $z_c$) of the target object, in the image collected by two infrared collectors 1, 2 at the same time, the feature point P has the following image coordinates in the first infrared image 11 and the second infrared image 12: $p_{left}$=($X_{left}$, $Y_{left}$), $p_{right}$=($X_{right}$, $Y_{right}$). Two images 11, 12 are aligned with each other horizontally after they are corrected, that is, two images 11, 12 are located at the same horizontal level. Thus, two images 11, 12 of the feature point P have the same Y coordinate, i.e., $Y_{left}$=$Y_{right}$=Y. It should be noted that the first infrared image 11 and the second infrared image 12 shown in FIG. 5 are illustrative and are intended for explanations, instead of real images displayed in practice.

From triangle geometric relations, $$X_{left} = f\frac{x_c}{z_c}$$

$$X_{right} = f\frac{(x_c - B)}{z_c}$$

$$Y = f\frac{y_c}{z_c}$$

then, Disparity is: Disparity=$X_{left}$−$X_{right}$, thus, the three-dimensional coordinates of the feature point P may be calculated under spatial coordinate system:

$$x_c = \frac{B \cdot X_{left}}{\text{Disparity}}$$

$$y_c = \frac{B \cdot Y}{\text{Disparity}}$$

$$z_c = \frac{B \cdot f}{\text{Disparity}}$$

where B is base line distance, i.e., the straight-line distance between projection centers of two infrared collectors 1, 2 and f is a focal length of the infrared collector.

Thus, as long as the matched points are found in the first infrared image 11 and the second infrared image 12, the two-dimensional coordinates of the matched points in the two infrared images 11, 12 can be known. The spatial three-dimensional coordinates of the points on the target object may be determined from the two-dimensional coordinates of the matched points. Such calculation is a point-to-point operation. The operation may be used for any point on the target object, so as to determine its three-dimensional spatial coordinates.

The present embodiment provides a method for acquiring depth information. From the characteristic of different response to the infrared lights with different wavelengths in the infrared image, it proposed a matching solution based on infrared spectrum response characteristics. In this way, the matching operation can be finished by finding the pixels with the same wavelength in two infrared images. The matching process is simple, easy to perform, may reduce the calculation amount significantly, so as to generate depth information rapidly and acquire the depth information in real-time indeed. The infrared spectrum is a continuous spectrum, thus, the acquired depth information is continuous and the edge has the same accuracy, thus it can have very high resolution and matching accuracy. Meanwhile, the depth camera involved in the method according to the embodiment may have a simple structure and thus not only can be miniaturized easily but also can reduce cost.

In practice, as the three-dimensional technology develops, applications of such as the three-dimensional display, machine vision and satellite remote sensing also need to acquire the depth information of the scene more and more. The method for acquiring depth information according to the present disclosure may also be applied in the above technical field and may be adapted for various application scenes. Its measuring range is not limited and thus has wide prospect in applications.

Based on the above method for acquiring depth information, the embodiment provides a device for acquiring the depth information. The device for acquiring depth information, as shown in FIG. 2A and FIG. 5, includes:

infrared spectrum projectors 3, 4 configured to project an infrared spectrum 5 to a target object 6;

infrared collectors 1, 2 configured to collect the infrared spectrum reflected by the target object 6 at different positions and to generate a first infrared image 11 and a second infrared image 12 respectively; and a processor 7 configured to process the first infrared image 11 and the second infrared image 12 on a basis of infrared spectrum response characteristics to acquire the depth information of the target object 6.

In an example, the infrared spectrum projectors 3, 4 include an infrared light source 3 and a diffraction device 4. The infrared light source 3 is configured to emit an infrared light. The diffraction device 4 is configured to disperse the infrared light emitted by the infrared light source 3 on a basis of its wavelengths to convert the light into the infrared spectrum 5 and to project the infrared spectrum 5 to the target object 6.

In an example, the infrared collectors 1, 2 include: a first infrared collector 1 and a second infrared collector 2 arranged on a same horizontal level. A predetermined distance is provided between the first infrared collector 1 and the second infrared collector 2, so that the first infrared collector 1 and the second infrared collector 2 can collect the infrared spectrum 5 reflected by the target object 6 at a first position and a second position respectively and to generate the first infrared image 11 and the second infrared image 12 from the infrared spectrum reflected by the target object 6 respectively. Further, infrared cameras in the first infrared collector 1 and the second infrared collector 2 have different responses to the infrared lights with different wavelengths and the wavelength to which the first infrared image and the second infrared image have maximum relative response is same to the wavelength having highest energy from the infrared light source.

In an example, the processor 7 is connected to the first infrared collector 1 and the second infrared collector 2 and receives the first infrared image 11 from the first infrared collector 1 and the second infrared image 12 from the second infrared collector 2 respectively. The processor 7 processes the first infrared image 11 and the second infrared image 12 on the basis of the infrared spectrum response characteristics to acquire the depth information of the target object 6.

Figure 2B:
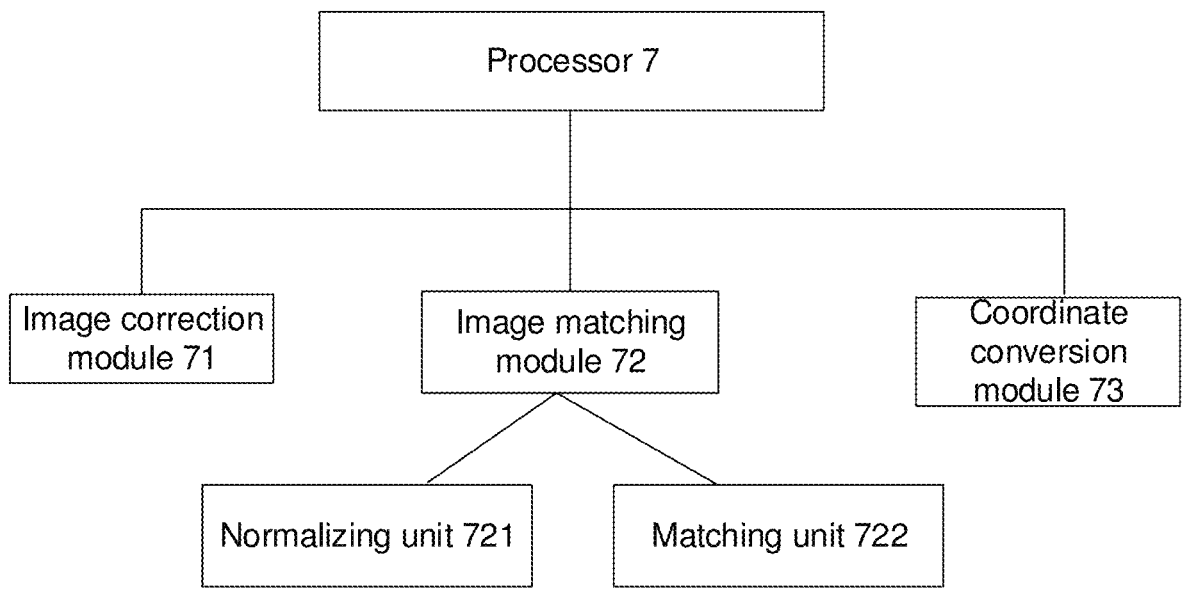
FIG. 2B is a block diagram of a processor shown in FIG. 2A.

Specifically, as shown in FIG. 2B, the processor 7 includes:

an image correcting module 71 configured to correct the first infrared image 11 and the second infrared image 12 to align the first infrared image 11 with the second infrared image 12 in horizontal direction;

an image matching module 72 configured to determine a plurality of matched points in the first infrared image 11 and the second infrared image 12 on the basis of the infrared spectrum response characteristics; and a coordinate converting module 73 configured to determine spatial three-dimensional coordinates of the target object 6 from two-dimensional coordinates at the plurality of matched points.

In an example, the image matching module 72 includes:

a normalizing unit 721 configured to normalize all of pixel values of the first infrared image 11 and the second infrared image 12;

a matching unit 722 configured to match pixels in rows of pixels in the first infrared image 11 and the second infrared image 12 on a same horizontal level to determine the plurality of matched points.

In fact, the normalizing process of the normalizing unit 721 is intended to improve the matching accuracy. It is not necessary for the image matching module and thus the image matching module may not include the normalizing unit in practice.

Figure 2C:
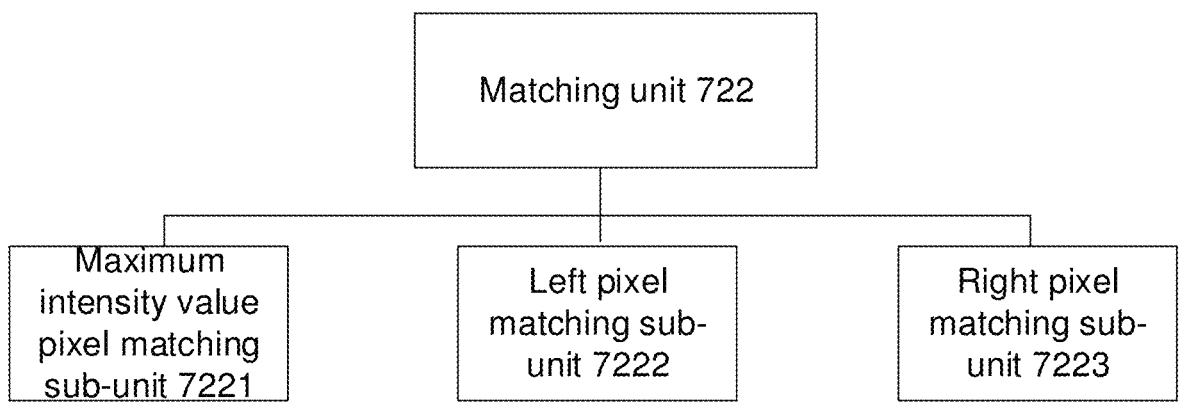
FIG. 2C is a block diagram of a matching unit shown in FIG. 2B.

In an example, as shown in FIG. 2C, the matching unit 722 includes:

a maximum intensity value pixel matching sub-unit 7221 configured to determine a first pixel of the first infrared image 11 having maximum intensity value in a row of pixels of the first infrared image 11, to determine a first pixel of the second infrared image 12 having maximum intensity value in a row of pixels of the second infrared image 12, and to determine the first pixel of the first infrared image 11 and the first pixel of the second infrared image 12 as matched points;

a left pixel matching sub-unit 7222 configured to select a pixel at a left side of the first pixel of the first infrared image and in the row of pixels of the first infrared image 11 and to determine an intensity value of the selected pixel, to find a pixel, which has same intensity value as the selected pixel, at a left side of the first pixel of the second infrared image 12 and in the row of pixels of the second infrared image 12, and to determine the selected pixel and the found pixel as matched points; and a right pixel matching sub-unit 7223 configured to select a pixel at a right side of the first pixel of the first infrared image 11 and in the row of pixels of the first infrared image 11 and to determine an intensity value of the selected pixel, to find a pixel, which has same intensity value as the selected pixel, at a right side of the first pixel of the second infrared image 12 and in the row of pixels of the second infrared image 12, and to determine the selected pixel and the found pixel as matched points.

Figure 6A:
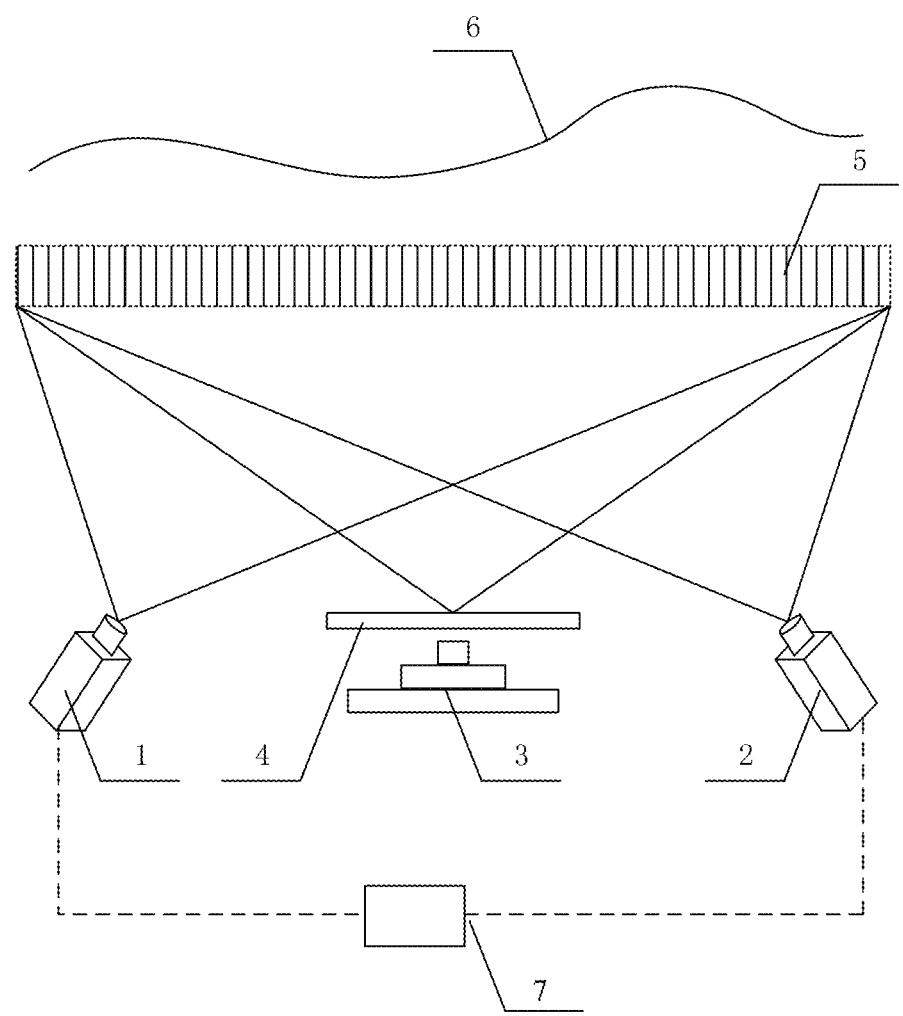
FIG. 6A is a schematic view showing another structure of a device for acquiring depth information according to an embodiment of the present disclosure.

FIG. 6A is a schematic view showing another structure of a device for acquiring depth information according to an embodiment of the present disclosure. As shown in FIG. 6A, the embodiment is an improvement on the above technical solutions. Instead, in the present embodiment, the infrared spectrum 5 projected to the target object 6 is a discrete infrared spectrum. The present embodiment uses the discrete infrared spectrum, which may further reduce the calculation amount and improve the matching accuracy. Since the infrared spectrum 5 projected to the target object 6 is a discrete infrared spectrum, the infrared spectrum reflected by the target object 6 is also a discrete infrared spectrum and the first infrared image 11 and the second infrared image 12 have discrete characteristics. During matching, it does not need to match each pixel as described in the above embodiments, but only needs to match each waveband. In this way, the calculation amount may be reduced greatly. Meanwhile, each waveband may be spaced by dark bands, thus, the errors for matching process can be suppressed greatly to improve the matching accuracy.

In the embodiment, the process flows and main structure are same to the above technical solutions, except the step S322 in the present embodiment includes:

Step S3221': determining a first waveband of the first infrared image having maximum average intensity value in a row of pixels of the first infrared image 11, determining a first waveband of the second infrared image having maximum average intensity value in a row of pixels of the second infrared image 12, and determining the first waveband of the first infrared image and the first waveband of the second infrared image as matched bands;

Step S3222': selecting a plurality of left adjacent wavebands sequentially at a left side of the first waveband of the first infrared image 11 and in the row of pixels of the first infrared image 11 depending on their distances from the first waveband of the first infrared image (sometimes, the distance can be interpreted as a proximate degree to the first waveband), selecting a plurality of left adjacent wavebands sequentially at a left side of the first waveband of the second infrared image depending on their distances from the first waveband of the second infrared image and correspondingly matching the plurality of left adjacent wavebands of the first infrared image with the plurality of left adjacent wavebands of the second infrared image to form matched bands; and Step S3223': selecting a plurality of right adjacent wavebands sequentially at a right side of the first waveband of the first infrared image and in the row of pixels of the first infrared image 11 depending on their distances from the first waveband of the first infrared image, selecting a plurality of right adjacent wavebands sequentially at a right side of the first waveband of the second infrared image(and in the row of pixels of the second infrared image 12) depending on their distances from the first waveband of the second infrared image and correspondingly matching the plurality of right adjacent wavebands of the first infrared image with the plurality of right adjacent wavebands of the second infrared image to form matched bands.

The step S3222' and the step S3223' may be performed simultaneously, or the step S3223' may be performed at first and then the step S3222' may be performed. The term of "correspondingly match" in the present embodiment means (taking the matching for the left side as an example), selecting a first left adjacent waveband, a second left adjacent waveband, . . . , sequentially at the left side of the first waveband of the first infrared image and in the row of pixels of the first infrared image 11 depending on their distances from the first waveband of the first infrared image; selecting a $1^{st}$ left adjacent waveband, a $2^{nd}$ left adjacent wave band, . . . , sequentially at the left side of the first waveband of the second infrared image(and in the row of pixels of the second infrared image 12) depending on their distances from the first waveband of the second infrared image; and matching the first left adjacent waveband of the first infrared image with the $1^{st}$ left adjacent wavebands of the second infrared image to form a matched band, matching the second left adjacent waveband of the first infrared image with the $2^{nd}$ left adjacent wavebands of the second infrared image to form another matched band, . . . .

Figure 6B:
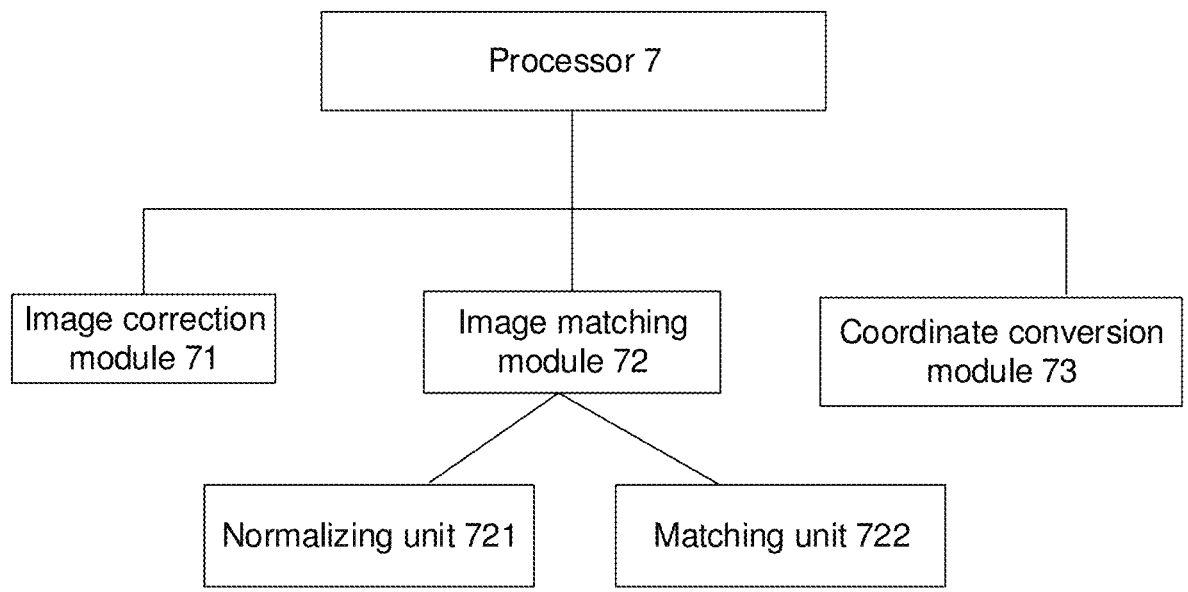
FIG. 6B is a block diagram of a processor shown in FIG. 6A.
Figure 6C:
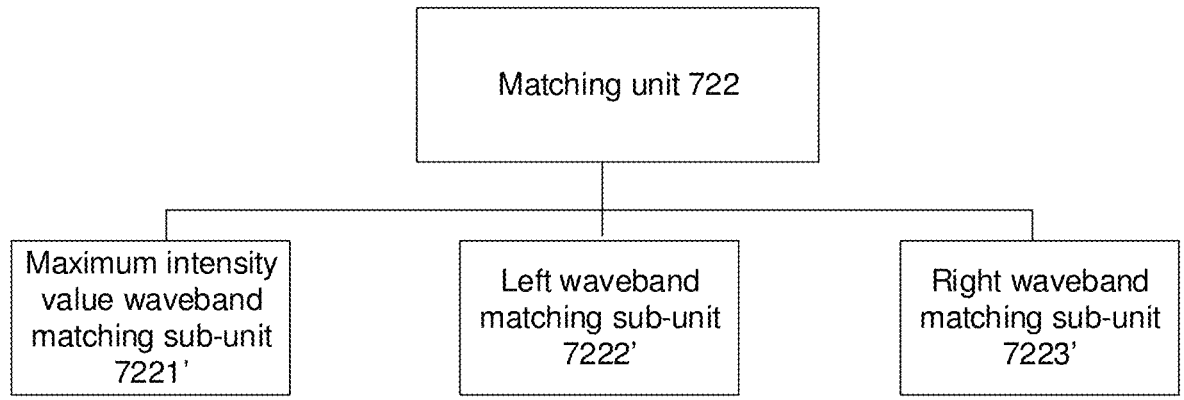
FIG. 6C is a block diagram of a matching unit shown in FIG. 6B.

Correspondingly, as shown in FIG. 6B, the matching unit 722 of the present embodiment includes:

a maximum intensity value waveband matching sub-unit 7221' configured to determine a first waveband of the first infrared image having maximum average intensity value in a row of pixels of the first infrared image 11, to determine a first waveband of the second infrared image having maximum average intensity value in a row of pixels of the second infrared image 12, and to determine the first waveband of the first infrared image and the first waveband of the second infrared image as matched bands;

a left waveband matching sub-unit 7222' configured to select a plurality of left adjacent wavebands sequentially at the left side of the first waveband of the first infrared image and in the row of pixels of the first infrared image 11 depending on their distances from the first waveband of the first infrared image, to select a plurality of left adjacent wavebands sequentially at the left side of the first waveband of the second infrared image (and in the row of pixels of the second infrared image) depending on their distances from the first waveband of the second infrared image and to correspondingly match the plurality of left adjacent wavebands of the first infrared image with the plurality of left adjacent wavebands of the second infrared image to form matched bands; and a right waveband matching sub-unit 7223' configured to select a plurality of right adjacent wavebands sequentially at the right side of the first waveband of the first infrared image and in the row of pixels of the first infrared image 11 depending on their distances from the first waveband of the first infrared image, to select a plurality of right adjacent wavebands sequentially at the right side of the first waveband of the second infrared image (and in the row of pixels of the second infrared image) depending on their distances from the first waveband of the second infrared image and to correspondingly match the plurality of right adjacent wavebands of the first infrared image with the plurality of right adjacent wavebands of the second infrared image to form matched bands.

On a basis of the technical concept of the above embodiments, the present embodiment provides a gesture recognition apparatus including a display apparatus and the device for acquiring depth information as described in the above embodiments of the present disclosure.

In recent years, as science and technology develop, the age of internet of things in which various things are interconnected with each other is coming. In a system of the internet of things, data required for achieving interconnection of various things must be collected by various sensors. Thus, the sensors with low cost, high integration and convenience for utilization will be popular in the future. The spread of mobile devices such as cell phones has brought the modern society into an age in which all the people read screens. The display screen has become necessary for the people. Thus, the display screen integrated with various sensors may be used as input terminals and output terminals of information. It may be final form of the future technical products. To this end, the present disclosure proposes a display apparatus which integrates the gesture recognition sensing device with the display screen and has a gesture recognition function.

Figure 7:
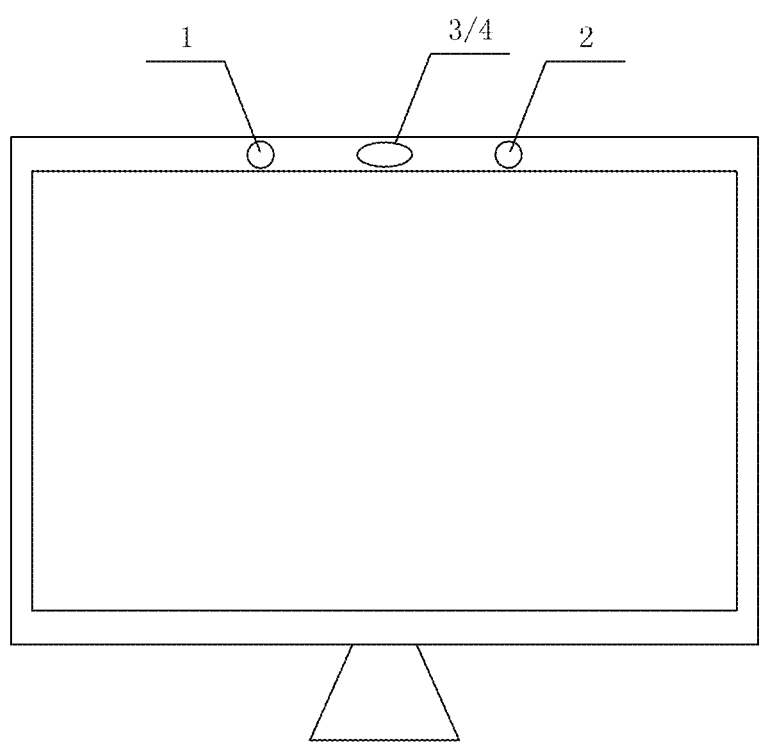
FIG. 7 is a schematic view showing a gesture recognition apparatus according to an embodiment of the present disclosure.

FIG. 7 is a schematic view showing a structure of the gesture recognition apparatus in accordance with the present disclosure. As shown in FIG. 7, the gesture recognition apparatus includes a display screen in which the processor 7 is arranged. The infrared spectrum projectors 3, 4 and the infrared collectors 1, 2 are arranged on an upper border of the display screen. The first infrared collector 1 and the second infrared collector 2 are arranged on both sides of the infrared spectrum projectors 3, 4 and there is a relatively large distance between the first infrared collector 1 and the second infrared collector 2. It may ensure accuracy of gesture recognition to large extent.

In practice, the infrared spectrum projectors 3, 4 and the infrared collectors 1, 2 may also be arranged on lower part of the display screen, or the first infrared collector 1 and the second infrared collector 2 are arranged on both sides of the display screen, to be adapted for different usage requirements of different users. They are not limited specifically herein. Meanwhile, considering that one device for acquiring depth information has a projection range of an inverse trapezoid in space, there may be some blind areas in the operation space of the user. In order to improve the accuracy and precision of gesture recognition to improve the user's experience, a plurality of devices for acquiring depth information may be simultaneously provided in one display apparatus.

In the description of the embodiments of the present disclosure, it should be understood that relation of orientations or positions which the terms of "middle", "upper", "lower", "front", "back", "vertical", "horizontal", "top", "bottom", "inner", "outer" and the like are those shown in figures. They are only intended to describe the present disclosure conveniently and briefly, instead of representing or implying these devices or elements must have special orientations and be constructed and operated by special orientations, thus they cannot be understood as limitations on the present disclosure.

In the description of the embodiments of the present disclosure, it should be noted that the terms of "mount", "connection" and "connecting" should be understood widely, unless there are explicitly specified and defined otherwise. For example, they may represent fixed connection, may also be connected detachably or integrally; they may be mechanical connection or electrical connection; they may be connected directly, or indirectly by intermediate medium, or may be internally communicated for two elements. The skilled person in the art will understand the specific significations of the above terms in the present disclosure as required.

The skilled person in the art should understand that the embodiments of the present disclosure may be implemented as methods, systems or computer program products. Therefore, the present disclosure may use forms of full hardware embodiments, full software embodiments, or combination of software and hardware embodiments. And the present disclosure may use the form of computer program products implemented on one or more computer accessible storage media containing computer accessible program codes (including but not being limited to magnetic memory and optical memory and the like).

The present disclosure has been described with reference to the flow chart and/or block diagram of the method, the device and the computer program products according to the embodiments of the present disclosure. It should be understood that the computer program request may achieve each flow and/or block in the flow chart and/or the block diagram and combination thereof. It may provide these computer program requests to processor of a general-purpose computer, a special-purpose computer, an embedded processing machine or other programmable information process apparatus to generate a machine, such that the request executed by the processor of the computer or the other programmable information process apparatus can generate a device for performing the specified function in one or more flows in the flow chart and/or one or more blocks in the block diagram.

These computer program requests may also be stored in computer readable memory that can lead computer or other programmable information process apparatus to work in special manner, such that the requests stored in the computer readable memory can generate manufactures including requesting device. The requesting device achieves the specified function in one or more flows in the flow chart and/or one or more blocks in the block diagram.

These computer program requests may also be loaded onto a computer or other programmable information process apparatus, such that a series of operation steps are performed on the computer or other programmable information process apparatus to generate processes that are performed by the computer. In this way, the requests executed in the computer or other programmable information process apparatus can provide steps for performing the specified function in one or more flows in the flow chart and/or one or more blocks in the block diagram.

Some exemplified embodiments of the present disclosure have been explained in the above description. However, the above embodiments are only intended to explain the present disclosure conveniently, instead of limiting the present disclosure. The skilled person in the art can make any variants or alternations in forms and details without departing from the spirit and scope of the present disclosure. However, the scope of the present disclosure should be defined by the scope delimited by the appended claims.

What is claimed is:

1. A method for acquiring depth information, comprising:
   projecting an infrared spectrum to a target object;
   collecting the infrared spectrum reflected by the target object at different positions and generating a first infrared image and a second infrared image respectively; and
   processing the first infrared image and the second infrared image on a basis of infrared spectrum response characteristics to acquire the depth information of the target object,
   wherein the step of processing the first infrared image and the second infrared image on a basis of infrared spectrum response characteristics to acquire the depth information of the target object comprises:
      correcting the first infrared image and the second infrared image to align the first infrared image with the second infrared image in a horizontal direction;
      determining a plurality of matched points in the first infrared image and the second infrared image on the basis of the infrared spectrum response characteristics; and
      determining spatial three-dimensional coordinates of the target object from two-dimensional coordinates of the plurality of matched points,
   wherein the step of determining the plurality of matched points in the first infrared image and the second infrared image on the basis of the infrared spectrum response characteristics comprises:
      matching pixels in rows of pixels in the first infrared image and the second infrared image on a same horizontal level to determine the plurality of matched points, and
   wherein the infrared spectrum projected to the target object is a continuous infrared spectrum, and the step of matching pixels in rows of pixels in the first infrared image and the second infrared image on the same horizontal level to determine the plurality of matched points comprises:
      determining a first pixel of the first infrared image having a maximum intensity value in a row of pixels of the first infrared image, determining a first pixel of the second infrared image having a maximum intensity value in a row of pixels of the second infrared image, and determining the first pixel of the first infrared image and the first pixel of the second infrared image as matched points;

selecting a pixel at a left side of the first pixel of the first infrared image and in the row of pixels of the first infrared image and determining an intensity value of the selected pixel, finding a pixel, which has a same intensity value as the selected pixel, at a left side of the first pixel of the second infrared image and in the row of pixels of the second infrared image, and determining the selected pixel and the found pixel as matched points; and selecting a second pixel at a right side of the first pixel of the first infrared image and in the row of pixels of the first infrared image and determining an intensity value of the selected second pixel, finding a second pixel, which has a same intensity value as the selected second pixel, at a right side of the first pixel of the second infrared image and in the row of pixels of the second infrared image, and determining the selected second pixel and the found second pixel as matched points.

2. The method according to claim 1, wherein the step of projecting the infrared spectrum to the target object comprises:

emitting an infrared light; and dispersing the infrared light on a basis of its wavelengths to convert the infrared light into the infrared spectrum and projecting the infrared spectrum to the target object.

3. The method according to claim 1, wherein the step of collecting the infrared spectrum reflected by the target object at different positions and generating the first infrared image and the second infrared image respectively comprises:

collecting the infrared spectrum reflected by the target object at a first position and a second position respectively; and generating the first infrared image and the second infrared image from the infrared spectrum reflected by the target object respectively;

wherein the first infrared image and the second infrared image have different responses to infrared lights with different wavelengths, and a wavelength to which the first infrared image and the second infrared image have maximum relative response is the same as a wavelength having highest energy from an infrared light source.

4. A method for acquiring depth information, comprising:

projecting an infrared spectrum to a target object;

collecting the infrared spectrum reflected by the target object at different positions and generating a first infrared image and a second infrared image respectively; and processing the first infrared image and the second infrared image on a basis of infrared spectrum response characteristics to acquire the depth information of the target object wherein the step of processing the first infrared image and the second infrared image on a basis of infrared spectrum response characteristics to acquire the depth information of the target object comprises:

correcting the first infrared image and the second infrared image to align the first infrared image with the second infrared image in a horizontal direction;

determining a plurality of matched points in the first infrared image and the second infrared image on the basis of the infrared spectrum response characteristics; and determining spatial three-dimensional coordinates of the target object from two-dimensional coordinates of the plurality of matched points, wherein the step of determining the plurality of matched points in the first infrared image and the second infrared image on the basis of the infrared spectrum response characteristics comprises:

matching pixels in rows of pixels in the first infrared image and the second infrared image on a same horizontal level to determine the plurality of matched points, and wherein the infrared spectrum projected to the target object is a discrete infrared spectrum; and the step of matching pixels in rows of pixels in the first infrared image and the second infrared image on the same horizontal level to determine the plurality of matched points comprises:

determining a first waveband of the first infrared image having a maximum average intensity value in a row of pixels of the first infrared image, determining a first waveband of the second infrared image having a maximum average intensity value in a row of pixels of the second infrared image, and determining the first waveband of the first infrared image and the first waveband of the second infrared image as matched bands;

selecting a plurality of left adjacent wavebands sequentially at a left side of the first waveband of the first infrared image and in the row of pixels of the first infrared image depending on distances of the plurality of left adjacent wavebands at the left side of the first waveband of the first infrared image from the first waveband of the first infrared image, selecting a plurality of left adjacent wavebands sequentially at a left side of the first waveband of the second infrared image and in the row of pixels of the second infrared image depending on distances of the plurality of left adjacent wavebands at the left side of the first waveband of the second infrared image from the first waveband of the second infrared image, and correspondingly matching the plurality of left adjacent wavebands of the first infrared image with the plurality of left adjacent wavebands of the second infrared image to form matched bands; and selecting a plurality of right adjacent wavebands sequentially at a right side of the first waveband of the first infrared image and in the row of pixels of the first infrared image depending on distances of the plurality of right adjacent wavebands at the right side of the first waveband of the first infrared image from the first waveband of the first infrared image, selecting a plurality of right adjacent wavebands sequentially at a right side of the first waveband of the second infrared image and in the row of pixels of the second infrared image depending on distances of the plurality of right adjacent wavebands at the right side of the first waveband of the second infrared image from the first waveband of the second infrared image, and correspondingly matching the plurality of right adjacent wavebands of the first infrared image with the plurality of right adjacent wavebands of the second infrared image to form matched bands.

5. The method according to claim 4, wherein the step of projecting the infrared spectrum to the target object comprises:

emitting an infrared light; and dispersing the infrared light on a basis of its wavelengths to convert the infrared light into the infrared spectrum and projecting the infrared spectrum to the target object.

6. The method according to claim 4, wherein the step of collecting the infrared spectrum reflected by the target object at different positions and generating the first infrared image and the second infrared image respectively comprises:

collecting the infrared spectrum reflected by the target object at a first position and a second position respectively; and generating the first infrared image and the second infrared image from the infrared spectrum reflected by the target object respectively;

wherein the first infrared image and the second infrared image have different responses to infrared lights with different wavelengths and a wavelength to which the first infrared image and the second infrared image have maximum relative response is the same as a wavelength having highest energy from an infrared light source.

7. A device for acquiring depth information and for performing the method according to claim 4, comprising:

an infrared spectrum projector configured to project an infrared spectrum to a target object;

an infrared collector configured to collect the infrared spectrum reflected by the target object at different positions and to generate a first infrared image and a second infrared image respectively; and a processor configured to process the first infrared image and the second infrared image on a basis of infrared spectrum response characteristics to acquire the depth information of the target object, wherein the processor comprises:

an image correcting module configured to correct the first infrared image and the second infrared image to align the first infrared image with the second infrared image in a horizontal direction;

an image matching module configured to determine a plurality of matched points in the first infrared image and the second infrared image on the basis of the infrared spectrum response characteristics; and a coordinate converting module configured to determine spatial three-dimensional coordinates of the target object from two-dimensional coordinates of the plurality of matched points, wherein the image matching module comprises:

a matching unit configured to match pixels in rows of pixels in the first infrared image and the second infrared image on a same horizontal level to determine the plurality of matched points, and wherein the infrared spectrum projected to the target object is a discrete infrared spectrum; and the matching unit comprises:

a maximum intensity value waveband matching sub-unit configured to determine a first waveband of the first infrared image having a maximum average intensity value in a row of pixels of the first infrared image, to determine a first waveband of the second infrared image having a maximum average intensity value in a row of pixels of the second infrared image, and to determine the first waveband of the first infrared image and the first waveband of the second infrared image as matched bands;

a left waveband matching sub-unit configured to select a plurality of left adjacent wavebands sequentially at a left side of the first waveband of the first infrared image and in the row of pixels of the first infrared image depending on distances of the plurality of left adjacent wavebands at the left side of the first waveband of the first infrared image from the first waveband of the first infrared image, to select a plurality of left adjacent wavebands sequentially at a left side of the first waveband of the second infrared image and in the row of pixels of the second infrared image depending on distances of the plurality of left adjacent wavebands at the left side of the first waveband of the second infrared image from the first waveband of the second infrared image, and to correspondingly match the plurality of left adjacent wavebands of the first infrared image with the plurality of left adjacent wavebands of the second infrared image to form matched bands; and a right waveband matching sub-unit configured to select a plurality of right adjacent wavebands sequentially at a right side of the first waveband of the first infrared image and in the row of pixels of the first infrared image depending on distances of the plurality of right adjacent wavebands at the right side of the first waveband of the first infrared image from the first waveband of the first infrared image, to select a plurality of right adjacent wavebands sequentially at a right side of the first waveband of the second infrared image and in the row of pixels of the second infrared image depending on distances of the plurality of right adjacent wavebands at the right side of the first waveband of the second infrared image from the first waveband of the second infrared image, and to correspondingly match the plurality of right adjacent wavebands of the first infrared image with the plurality of right adjacent wavebands of the second infrared image to form matched bands.

8. The device according to claim 7, wherein the infrared spectrum projector comprises:

an infrared light source configured to emit an infrared light; and a diffraction device configured to disperse the infrared light on a basis of its wavelengths to convert the infrared light into the infrared spectrum and configured to project the infrared spectrum to the target object.

9. The device according to claim 7, wherein the infrared collector comprises a first infrared collector and a second infrared collector arranged on a same horizontal level, a predetermined distance between the first infrared collector and the second infrared collector being provided, the first infrared collector and the second infrared collector being configured to collect the infrared spectrum reflected by the target object at a first position and a second position respectively and to generate the first infrared image and the second infrared image from the infrared spectrum reflected by the target object respectively;

wherein the first infrared collector and the second infrared collector have different responses to infrared lights with different wavelengths and a wavelength to which the first infrared image and the second infrared image have maximum relative response is the same as a wavelength having highest energy from an infrared light source.

10. A gesture recognition apparatus comprising the device for acquiring depth information according to claim 7.

11. A device for acquiring depth information, comprising:

an infrared spectrum projector configured to project an infrared spectrum to a target object;

an infrared collector configured to collect the infrared spectrum reflected by the target object at different positions and to generate a first infrared image and a second infrared image respectively; and a processor configured to process the first infrared image and the second infrared image on a basis of infrared spectrum response characteristics to acquire the depth information of the target object, wherein the processor comprises:
- an image correcting module configured to correct the first infrared image and the second infrared image to align the first infrared image with the second infrared image in a horizontal direction;
- an image matching module configured to determine a plurality of matched points in the first infrared image and the second infrared image on the basis of the infrared spectrum response characteristics; and
- a coordinate converting module configured to determine spatial three-dimensional coordinates of the target object from two-dimensional coordinates of the plurality of matched points, wherein the image matching module comprises:
- a matching unit configured to match pixels in rows of pixels in the first infrared image and the second infrared image on a same horizontal level to determine the plurality of matched points, and wherein the infrared spectrum projected to the target object is a continuous infrared spectrum, and the matching unit comprises:
- a maximum intensity value pixel matching sub-unit configured to determine a first pixel of the first infrared image having a maximum intensity value in a row of pixels of the first infrared image, to determine a first pixel of the second infrared image having a maximum intensity value in a row of pixels of the second infrared image, and to determine the first pixel of the first infrared image and the first pixel of the second infrared image as matched points;
- a left pixel matching sub-unit configured to select a pixel at a left side of the first pixel of the first infrared image and in the row of pixels of the first infrared image and to determine an intensity value of the selected pixel, to find a pixel, which has a same intensity value as the selected pixel, at a left side of the first pixel of the second infrared image and in the row of pixels of the second infrared image, and to determine the selected pixel and the found pixel as matched points; and
- a right pixel matching sub-unit configured to select a second pixel at a right side of the first pixel of the first infrared image and in the row of pixels of the first infrared image and to determine an intensity value of the selected second pixel, to find a second pixel, which has a same intensity value as the selected second pixel, at a right side of the first pixel of the second infrared image and in the row of pixels of the second infrared image, and to determine the selected second pixel and the found second pixel as matched points.

12. The device according to claim 11, wherein the infrared spectrum projector comprises:
- an infrared light source configured to emit an infrared light; and
- a diffraction device configured to disperse the infrared light on a basis of its wavelengths to convert the infrared light into the infrared spectrum, and configured to project the infrared spectrum to the target object.

13. The device according to claim 11, wherein the infrared collector comprises a first infrared collector and a second infrared collector arranged on a same horizontal level, a predetermined distance between the first infrared collector and the second infrared collector being provided, the first infrared collector and the second infrared collector being configured to collect the infrared spectrum reflected by the target object at a first position and a second position respectively and to generate the first infrared image and the second infrared image from the infrared spectrum reflected by the target object respectively;

wherein the first infrared collector and the second infrared collector have different responses to infrared lights with different wavelengths, and a wavelength to which the first infrared image and the second infrared image have maximum relative response is the same as a wavelength having highest energy from an infrared light source.

14. A gesture recognition apparatus comprising the device for acquiring depth information according to claim 11.

* * * * *